(12) United States Patent
Yamaguchi

(10) Patent No.: US 9,469,936 B2
(45) Date of Patent: Oct. 18, 2016

(54) POLY(METH)ACRYLIC ACID-BASED POLYMER COMPOSITION

(75) Inventor: Shigeru Yamaguchi, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 141 days.

(21) Appl. No.: 14/240,941

(22) PCT Filed: Aug. 30, 2012

(86) PCT No.: PCT/JP2012/072003
§ 371 (c)(1),
(2), (4) Date: Feb. 25, 2014

(87) PCT Pub. No.: WO2013/031890
PCT Pub. Date: Mar. 7, 2013

(65) Prior Publication Data
US 2014/0235794 A1 Aug. 21, 2014

(30) Foreign Application Priority Data

Aug. 31, 2011 (JP) .................................. 2011-188398
May 18, 2012 (JP) .................................. 2012-113964

(51) Int. Cl.
| | | |
|---|---|---|
| C08F 2/44 | (2006.01) | |
| D06M 15/263 | (2006.01) | |
| C09D 133/02 | (2006.01) | |
| C08K 3/32 | (2006.01) | |
| C08K 5/41 | (2006.01) | |

(52) U.S. Cl.
CPC .............. *D06M 15/263* (2013.01); *C08F 2/44* (2013.01); *C08K 3/32* (2013.01); *C08K 5/41* (2013.01); *C09D 133/02* (2013.01); *C08L 2203/12* (2013.01)

(58) Field of Classification Search
None
See application file for complete search history.

(56) References Cited

U.S. PATENT DOCUMENTS

| | | | |
|---|---|---|---|
| 5,077,361 A | * | 12/1991 | Hughes et al. ............... 526/233 |
| 5,160,789 A | * | 11/1992 | Barcus .................. A61F 13/534 |
| | | | 162/146 |
| 5,216,099 A | | 6/1993 | Hughes et al. |
| 5,256,746 A | * | 10/1993 | Blankenship et al. ........ 526/233 |
| 6,310,156 B1 | * | 10/2001 | Maeda et al. .................. 526/234 |
| 6,409,881 B1 | * | 6/2002 | Jaschinski ............. C08B 15/005 |
| | | | 162/100 |
| 6,432,517 B1 | * | 8/2002 | Yokota et al. ............. 428/32.21 |
| 7,994,242 B2 | * | 8/2011 | Flohr ...................... A61L 15/24 |
| | | | 424/488 |
| 2009/0199349 A1 | * | 8/2009 | Weinstein .......................... 8/120 |
| 2013/0261257 A1 | | 10/2013 | Wakao et al. |

FOREIGN PATENT DOCUMENTS

| | | |
|---|---|---|
| BI | 2008-056964 | 3/2008 |
| EP | 0 405 818 | 1/1991 |
| EP | 0 510 831 | 10/1992 |
| EP | 2 065 403 | 6/2009 |
| JP | 56-55407 | 5/1981 |
| JP | 3-121101 | 5/1991 |
| JP | 6-263803 | 9/1994 |
| JP | 10-509485 | 9/1998 |
| JP | 2002-508456 | 3/2002 |
| JP | 2003183306 | 7/2003 |
| JP | 2003-277409 | 10/2003 |
| JP | 2008-505254 | 2/2008 |
| JP | 2009-191434 | 8/2009 |
| JP | 2009-242593 | 10/2009 |
| JP | 2010-077340 | 4/2010 |
| JP | 2010083991 | 4/2010 |
| JP | 2010084030 | 4/2010 |
| JP | 2011-021130 | 2/2011 |
| WO | 96/15075 | 5/1996 |
| WO | 99/31312 | 6/1999 |
| WO | 2006/009823 | 1/2006 |
| WO | 2012/086716 | 6/2012 |

* cited by examiner

*Primary Examiner* — Robert C Boyle
(74) *Attorney, Agent, or Firm* — Hamre, Schumann, Mueller & Larson, P.C.

(57) ABSTRACT

The present invention provides a polymer composition capable of providing fibers with an enough penetration speed and enough water retention, while maintaining a favorable hue of the fibers, when used as a fiber crosslinking agent. The present invention also provides a fiber crosslinking agent and crosslinked fibers using the polymer composition. The present invention further provides a polymer composition that enhances the absorption properties of fibers and is especially useful for applications which strongly require the absorption properties, and a fiber crosslinking agent and crosslinked fibers using the polymer composition. The present invention is a polymer composition containing a poly(meth)acrylic acid polymer; and a bisulfite (salt)-added (meth)acrylic acid (salt) or a hypophosphorous acid (salt).

9 Claims, 1 Drawing Sheet

US 9,469,936 B2

POLY(METH)ACRYLIC ACID-BASED POLYMER COMPOSITION

TECHNICAL FIELD

The present invention relates to a poly(meth)acrylic acid polymer composition. More specifically, the present invention relates to a poly(meth)acrylic acid polymer composition usable as a fiber crosslinking agent, and a fiber crosslinking agent and a crosslinked fiber each using the composition.

BACKGROUND ART

Fibers processed by intramolecular chemical crosslinking are known to have better fluid absorption properties and are indispensable for production of various living supplies, medical supplies, and the like. A crosslinking agent is commonly used for production of crosslinked fibers (also referred to as treated fibers), and various compounds are known as crosslinking agents for fibers (also referred to as fiber crosslinking agents). For example, Patent Literature 1 discloses individualized and chemically crosslinked cellulose fibers that contain cellulose fibers processed by intrafiber crosslinking with use of a polymer polycarboxylic acid crosslinking agent, the polymer polycarboxylic acid crosslinking agent having a molecular weight from about 500 to about 40000. In one embodiment disclosed, such a polymer polycarboxylic acid crosslinking agent is selected from the group consisting of polyacrylic acid polymers, polymaleic acid polymers, acrylic acid copolymers, maleic acid copolymers, and mixtures of these. Patent Literature 2 discloses cellulose fibers having intrafiber crosslinks formed with a phosphinate-containing telomer of acrylic acid that has a penetration factor of at least 65 and a Tgd from about 70° C. to about 105° C.

CITATION LIST

Patent Literature

Patent Literature 1: JP-T 2002-508456
Patent Literature 2: JP-A 2009-191434

SUMMARY OF INVENTION

Technical Problem

As mentioned above, various compounds are known as fiber crosslinking agents. Crosslinking agents are, however, still demanded to improve the absorption speed (also referred to as penetration speed) and water retention of fibers (especially, pulp fibers), while maintaining a favorable hue of the fibers. Moreover, crosslinking agents are also wanted to enhance the absorption properties of fibers (especially, pulp fibers).

The present invention has been devised in view of the state of the art, and aims to provide a polymer composition capable of providing fibers with an enough absorption speed and enough water retention, while maintaining a favorable hue of the fibers, when used as a fiber crosslinking agent. The present invention further aims to provide a fiber crosslinking agent and crosslinked fibers using the polymer composition. The present invention also aims to provide a polymer composition that enhances the absorption properties of fibers and is especially useful for applications which strongly require the absorption properties. The present invention further aims to provide a fiber crosslinking agent and crosslinked fibers using the polymer composition.

Solution to Problem

The present inventors have intensively studied about compositions usable for various applications, such as fiber crosslinking agents, to find out the following. Especially useful as a fiber crosslinking agent is a polymer composition containing a poly(meth)acrylic acid polymer and a predetermined amount of bisulfite (salt)-added (meth)acrylic acid (salt), the poly(meth)acrylic acid polymer having a main chain terminated with a sulfonic acid (salt) group and having a specific weight average molecular weight. Specifically, the polymer composition used as a fiber crosslinking agent improves the absorption speed and water retention of fibers, while maintaining a favorable hue of the fibers, thereby producing crosslinked fibers suitably used for living supplies, medical supplies, and the like. Moreover, the absorption properties of fibers are enhanced when a used fiber crosslinking agent is a polymer composition containing a poly(meth)acrylic acid polymer and a predetermined amount of hypophosphorous acid (salt), the poly(meth)acrylic acid polymer containing a predetermined amount of hypophosphorous acid (salt) groups and having a specific weight average molecular weight. Accordingly, such a polymer composition is especially useful for applications which strongly require the absorption properties. In this manner, the present inventors solved the above problems, thereby completing the present invention.

The present invention comprises the following four aspects (1) to (4).

(1) A poly(meth)acrylic acid polymer composition containing: a poly(meth)acrylic acid polymer; and a bisulfite (salt)-added (meth)acrylic acid (salt), wherein the poly(meth)acrylic acid polymer includes a main chain terminated with a sulfonic acid (salt) group and has a weight average molecular weight of 500 to 1000000, and the amount of the bisulfite (salt)-added (meth)acrylic acid (salt) is 0.5 to 15 parts by mass relative to 100 parts by mass of the poly(meth) acrylic acid polymer in the polymer composition.

(2) A poly(meth)acrylic acid polymer composition containing: a poly(meth)acrylic acid polymer; and a hypophosphorous acid (salt), wherein the poly(meth)acrylic acid polymer includes 0.6 to 10% by mass of hypophosphorous acid (salt) groups in a molecule and has a weight average molecular weight of 500 to 1000000, and the amount of the hypophosphorous acid (salt) is 10 to 50000 ppm relative to the total amount of the poly(meth)acrylic acid polymer in the polymer composition.

(3) A fiber crosslinking agent containing the poly(meth) acrylic acid polymer composition of the aspects (1) or (2).

(4) A crosslinked fiber which is prepared through a treatment using the poly(meth)acrylic acid polymer composition of the aspects (1) or (2).

The present invention is specifically described below. Preferable embodiments of the present invention cover embodiments including two or three or more preferable embodiments of the present invention paragraphed in the following in combination.

[Poly(Meth)Acrylic Acid Polymer Composition]

The poly(meth)acrylic acid polymer composition (also referred to as a polymer composition (1)) of the aspect (1) contains a poly(meth)acrylic acid polymer and a bisulfite (salt)-added (meth)acrylic acid (salt). The poly(meth)acrylic acid polymer composition (also referred to as a polymer composition (2)) of the aspect (2) contains a poly(meth)

acrylic acid polymer and a hypophosphorous acid (salt). Each of these components contained in the polymer compositions may be a single compound or two or more compounds in combination. The polymer composition may further contain one or two or more other components.

The poly(meth)acrylic acid polymers contained in the polymer compositions (1) and (2) refer to polymers having a structural unit derived from a (meth)acrylic acid (salt). The structural unit derived from a (meth)acrylic acid (salt) is formed by radical polymerization of a (meth)acrylic acid (salt) and is represented by —$CH_2CR(COOM)$—. In the formula, R is a hydrogen atom or methyl group, and M is a hydrogen atom, metal atom, ammonium salt, or organic amine salt.

Here, "(meth)acrylic acid" means "methacrylic acid and/or acrylic acid" and "(meth)acrylic acid (salt)" means "a salt of (meth)acrylic acid and/or (meth)acrylic acid".

The salt of the term "a salt of (meth)acrylic acid" means a metal salt, ammonium salt, or organic amine salt. The same shall apply to the salt of, for example, a term "a salt of an acid substance", unless otherwise specified.

Examples of the metal salt include: alkali metal salts such as sodium salt and potassium salt; alkaline earth metal salts such as calcium salt; and transition metal salts such as iron salt. Examples of the organic amine salt include: primary to quaternary amine salts such as methylamine salt, n-butylamine salt, monoethanolamine salt, dimethylamine salt, diethanolamine salt, morpholine salt, and trimethylamine salt.

The poly(meth)acrylic acid polymer preferably has non-neutralized carboxyl groups (i.e., carboxyl groups (—COOH groups) not neutralized with an alkaline substance). Particularly, the proportion of non-neutralized carboxyl groups is preferably 50 to 100 mol % based on 100 mol % of the total of non-neutralized carboxyl groups and neutralized carboxyl groups in each polymer. Such a polymer composition is especially suitable in the case of being used as a pulp fiber crosslinking agent. When the proportion of non-neutralized carboxyl groups is 50 to 100%, use of a polymer composition containing the above polymer, as a fiber crosslinking agent, further significantly improves the water absorption properties of treated fibers. The proportion is more preferably 60 to 100%, and still more preferably 80 to 100%.

The poly(meth)acrylic acid polymer may only have a structural unit derived from a (meth)acrylic acid (salt). Alternatively, the poly(meth)acrylic acid polymer may have a structural unit derived from a (meth)acrylic acid (salt) and structural unit(s) derived from other monomer(s) copolymerizable with the (meth)acrylic acid (salt). One or two or more kinds of (meth)acrylic acid (salts) and one or two or more kinds of other monomers may be used.

Examples of the other monomer(s) include: carboxyl group-containing monomers other than (meth)acrylic acid, such as maleic acid, fumaric acid, itaconic acid, crotonic acid, 2-methyleneglutaric acid, and salts of these; hydroxy group-containing alkyl(meth)acrylates, such as 2-hydroxy ethyl(meth)acrylate, 2-hydroxy propyl(meth)acrylate, 3-hydroxy propyl(meth)acrylate, 2-hydroxy butyl(meth)acrylate, 4-hydroxy butyl(meth)acrylate, and α-hydroxy methyl ethyl (meth)acrylate; alkyl(meth)acrylates that are esters containing C1-C18 alkyl groups of (meth)acrylic acids, such as methyl(meth)acrylate, ethyl(meth)acrylate, butyl(meth)acrylate, cyclohexyl(meth)acrylate, and lauryl(meth)acrylate; amino group-containing acrylates such as dimethylaminoethyl(meth)acrylate or quaternization products thereof; amide group-containing monomers such as (meth)acrylamide, dimethyl acrylamide, and isopropyl acrylamide; vinyl esters such as vinyl acetate; alkenes such as ethylene and propylene; aromatic vinyl monomers such as styrene; maleimide derivatives such as maleimide, phenylmaleimide, and cyclohexylmaleimide; nitrile group-containing vinyl monomers such as (meth)acrylonitrile; sulfonic acid group-containing monomers and salts thereof, such as 3-allyloxy-2-hydroxypropane sulfonic acid, 2-acrylamide-2-methylpropane sulfonic acid, styrene sulfonic acid, and vinyl sulfonic acid; phosphonic acid group-containing monomers, such as vinyl phosphonic acid, and (meth)allyl phosphonic acid; aldehyde group-containing vinyl monomers such as (meth)acrolein; alkyl vinyl ethers such as methyl vinyl ether, ethyl vinyl ether, and butyl vinyl ether; monomers containing other functional groups, such as vinyl chloride, vinylidene chloride, allyl alcohol, and vinyl pyrrolidone; and polyalkylene glycol chain-containing monomers such as monomers having a structure in which 1 to 300 mol of alkylene oxide is added to an unsaturated alcohol (e.g., polyalkylene glycol (meth)acrylate, monoalkoxy polyalkylene glycol(meth)acrylate, vinyl alcohol, (meth)allyl alcohol, isoprenol).

The poly(meth)acrylic acid polymer preferably contains a structural unit derived from a (meth)acrylic acid (salt) in an acid equivalent amount of 60 to 100% by mass based on 100% by mass of the sum of the structural units derived from all the monomers contained in the polymer (i.e., total of the structural unit derived from a (meth)acrylic acid (salt) and optional structural unit(s) derived from other monomer(s)). If the amount of the structural unit derived from a (meth)acrylic acid (salt) is at least 60% by mass, in the case where a polymer composition containing the polymer is used as a fiber crosslinking agent, the treated fiber has further enhanced water absorption properties. The amount is more preferably 90 to 100% by mass.

Here, the "acid equivalent amount" is obtained by calculating the mass ratio of an acid-form monomer corresponding to the salt-form monomer. In the case of a structural unit derived from sodium (meth)acrylate, for example, the mass ratio is calculated as the structural unit derived from (meth) acrylic acid. The mass ratio(s) of other monomer(s) is/are similarly calculated as the acid equivalent mass ratio(s).

The amount of the structural unit(s) derived from other monomer(s) is preferably 0 to 40% by mass based on 100% by mass of the structural unit derived from all the monomers contained in the polymer. The amount is more preferably 0 to 10% by mass.

A (meth)acrylate polymer (also referred to as a polymer (1)) contained in the polymer composition (1) contains (has) a main chain terminated with a sulfonic acid (salt) group on at least one end. It is to be noted that the polymer composition (1) may contain a polymer having a main chain not terminated with a sulfonic acid (salt) group (e.g., a (meth) acrylate polymer having a main chain not terminated with a sulfonic acid (salt) group). The sulfonic acid (salt) group means a sulfonic acid group and/or a sulfonic acid salt group. The polymer composition (1) of the present invention has a main chain terminated with a sulfonic acid (salt) group on at least one end. In the case where such a polymer composition (1) is used as a fiber crosslinking agent, the absorption speed and water retention of the treated fiber (crosslinked fiber) are both improved, and further, a favorable hue of the treated fiber is maintained.

The presence of a sulfonic acid (salt) group on at least one end of the main chain of the polymer (1) is confirmed by, for example, $^1$HNMR analysis.

The sulfonic acid (salt) group on the main chain terminal is introduced into a molecule of the polymer by, for example, polymerizing a monomer component containing an acrylic acid (salt) with use of a bisulfite (salt) (or a compound capable of producing a bisulfite (salt)) as a chain transfer agent, as described later.

The polymer (1) has a weight average molecular weight of 500 to 1000000. The weight average molecular weight exceeding this range increases the viscosity to complicate the handling of the composition. In contrast, if the weight average molecular weight is below this range, in the case where the polymer composition (1) containing the polymer (1) is used as a fiber crosslinking agent, the water retention of the treated fiber may not be enough. The weight average molecular weight is more preferably 800 to 100000, and still more preferably 1000 to 50000. For the purpose of improving the absorption speed of fibers to be treated, the weight average molecular weight is most preferably 1000 to 3000.

The numerical value of the weight average molecular weight of polymers herein is measured by the method described in examples mentioned later.

The polymer (1) has a molecular weight distribution (weight average molecular weight (Mw)/number average molecular weight (Mn)) of preferably 1.1 to 3. In such a case, the polymer composition (1) containing the polymer (1) used as a fiber crosslinking agent further enhances the water retention of the treated fibers. The molecular weight distribution is more preferably 1.5 to 2.8, and still more preferably 1.8 to 2.6.

The numerical value of the molecular weight distribution of polymers herein is measured by the method described in examples mentioned later.

In the polymer composition (1), the proportion of the polymer (1) is appropriately set in accordance with the intended use of the polymer composition (1), and is preferably, for example, 1 to 99.5% by mass based on 100% by mass of the solids content of the polymer composition (1) (hereinafter, also referred to as solids equivalent).

The polymer composition (1) further contains, in addition to the above polymer (1), a bisulfite (salt)-added (meth) acrylic acid (salt). The bisulfite (salt)-added (meth)acrylic acid (salt) also refers to a compound prepared by adding a bisulfite (salt) to a (meth)acrylic acid (salt), and means a compound in which a bisulfite (salt) (i.e., bisulfite and/or a salt thereof) is added to a (meth)acrylic acid (salt) and the (meth)acrylic acid (salt) is not polymerized. Examples thereof include 3-sulfopropionic acid (salts).

In the polymer composition (1), the proportion of the bisulfite (salt)-added (meth)acrylic acid (salt) is 0.5 to 15 parts by mass based on 100 parts by mass of the sum of the poly(meth)acrylic acid polymers in the polymer composition (1). With the proportion of the bisulfite (salt)-added (meth)acrylic acid (salt) within this range, the polymer composition (1) used as a fiber crosslinking agent allows the treated fibers to have an enough absorption speed and enough water retention, while maintaining a favorable hue of the fibers. The lower limit of the proportion of the bisulfite (salt)-added (meth)acrylic acid (salt) is preferably at least 0.8 part by mass, and more preferably at least 2 parts by mass. The upper limit thereof is preferably at most 13 parts by mass.

In the case where the polymer composition (1) contains other poly(meth)acrylic acid polymers in addition to the poly(meth)acrylic acid polymers having a main chain terminated with a sulfonic acid (salt) group on at least one end, the phrase "the sum of the poly(meth)acrylic acid polymers in the polymer composition (1)" refers to the total amount including the other poly(meth)acrylic acid polymers. In calculation of the proportion of the bisulfite (salt)-added (meth)acrylic acid (salt), the acid equivalent amounts of the adduct and of the poly(meth)acrylic acid polymer are obtained (i.e., in the case of a salt, the amount of the corresponding acid is calculated).

The polymer composition (1) may further contain a hypophosphorous acid (salt) for the purpose of enhancing the water absorption properties. In the case where the polymer composition (1) contains a hypophosphorous acid salt, the amount thereof is preferably 10 to 50000 ppm (mass ppm) relative to the sum of the poly(meth)acrylic acid polymers in the polymer composition (1). The amount is preferably at least 20 ppm and still more preferably at least 100 ppm, and preferably at most 20000 ppm and still more preferably at most 10000 ppm.

In calculation of the amount of a hypophosphorous acid (salt), the acid equivalent amounts of the poly(meth)acrylic acid polymer and the hypophosphorous acid (salt) are obtained. In the case where the hypophosphorous acid (salt) is a hydrate, the amount of the corresponding anhydride is calculated.

The polymer composition (1) may contain a bisulfite (salt). A bisulfite (salt) contained is likely to enhance the brightness of the crosslinked fiber (especially, pulp fiber). In the case where the polymer composition (1) contains a bisulfite (salt), the amount thereof is preferably at least 0.01 part by mass and more preferably at least 0.05 part by mass, and preferably at most 2 parts by mass and more preferably at most 1 part by mass, based on 100 parts by mass of the sum of the poly(meth)acrylic acid polymers in the polymer composition (1).

In calculation of the amount of a bisulfite (salt), the acid equivalent amounts of the poly(meth)acrylic acid polymer and the bisulfite (salt) are obtained.

The (meth)acrylate polymers (also referred to as polymers (2)) in the polymer composition (2) contain (have) a hypophosphorous acid (salt) group in a molecule. The hypophosphorous acid (salt) group means a hypophosphorous acid group and/or a hypophosphorous acid salt group. For example, a sodium hypophosphite group is represented by —PH(=O)(ONa), or —P(=O)(ONa)—. In the case where the polymer composition (2) of the present invention which contains the polymers (2) having a hypophosphorous acid (salt) group in a molecule is used as a fiber crosslinking agent, the treated fiber has better water absorption properties.

The amount of the hypophosphorous acid (salt) group in the polymer (2) is suitably 0.6 to 10% by mass based on 100% by mass of the polymer (2). In such a case, the water absorption properties of the treated fiber may be significantly improved and the treated fiber is useful especially for applications which require the absorption properties. The amount of the hypophosphorous acid (salt) is preferably 1 to 6% by mass.

The amount of the hypophosphorous acid (salt) group in the polymer (2) is measured, for example, by $^{31}$PNMR analysis.

The hypophosphorous acid (salt) group is introduced into a molecule of a polymer, for example, by polymerizing a monomeric component containing an acrylic acid (salt) with use of a hypophosphorous acid (salt) as a chain transfer agent.

The polymer (2) has a weight average molecular weight of 500 to 1000000. The weight average molecular weight exceeding the above range increases the viscosity to complicate the handling of the composition. In contrast, if the weight average molecular weight is below the above range, the polymer composition (2) containing the polymer (2)

used as a fiber crosslinking agent may fail to provide the treated fiber with sufficient water absorption properties. The weight average molecular weight is more preferably at least 2000, still more preferably at least 4000, further preferably at least 5000, still further preferably at least 10000, especially preferably at least 12000, and most preferably at least 15000. The weight average molecular weight is preferably at most 100000, and more preferably at most 50000.

The polymer (2) has a molecular weight distribution (weight average molecular weight (Mw)/number average molecular weight (Mn)) of suitably 1.1 to 3. In such a case, the polymer composition (2) containing the polymer (2) used as a fiber crosslinking agent further improves the water absorption properties of the treated fiber. The molecular weight distribution is more preferably 1.5 to 2.8, and still more preferably 1.8 to 2.6.

In the polymer composition (2), the amount of the polymer (2) may be appropriately set in accordance with the intended use of the polymer composition (2), and is preferably, for example, 1 to 99.9% by mass based on 100% by mass of the solids content of the polymer composition (1) (also referred to as solids equivalent).

The polymer composition (2) also contains a hypophosphorous acid (salt) in addition to the polymer (2). The amount of the hypophosphorous acid (salt) is 10 to 50000 ppm relative to the sum of the poly(meth)acrylic acid polymers in the polymer composition (2). If the amount is less than 10 ppm, the resulting polymer composition (2) may not have a favorable hue. In contrast, if the amount is more than 50000 ppm, the polymer composition (2) used as a fiber crosslinking agent may fail to provide the treated fiber with sufficient water absorption properties. The amount is preferably at least 20 ppm and more preferably at least 100 ppm, and preferably at most 20000 ppm and more preferably at most 10000 ppm.

In the case where the polymer composition (2) contains other poly(meth)acrylic acid polymer(s) in addition to the poly(meth)acrylic acid polymer containing a hypophosphorous acid (salt) group, the phrase "the sum of the poly(meth) acrylic acid polymers in the polymer composition (2)" herein refers to the total amount including the other poly (meth)acrylic acid polymer(s).

The (meth)acrylate polymer compositions of the present invention (polymer compositions (1) and (2)) may contain, in addition to the above components, one or two or more of unreacted (meth)acrylic acid (salts), unreacted other monomers, unreacted polymerization initiators, and decomposed matters of polymerization initiators.

The amount of unreacted monomers present in the (meth) acrylate polymer composition (total amount of the (meth) acrylic acid (salt) and other monomers) is preferably less than 1% by mass based on 100% by mass of the solids content of the polymer composition, though it depends on the kind of the monomers used. The amount is more preferably less than 0.5% by mass and still more preferably less than 0.1% by mass.

The (meth)acrylate polymer composition may or may not contain a solvent. In the case where a solvent is contained, the amount thereof is preferably 25 to 99% by mass based on 100% by mass of the polymer composition. If the amount is less than 25% by mass, the composition may be highly viscous, leading to poor handleability thereof. The solvent is not limited, and water is preferably used.

[Production Method of Poly(Meth)Acrylic Acid Polymer (Composition)]

The poly(meth)acrylic acid polymer compositions (polymer compositions (1) and (2)) of the present invention may be produced by, for example, a polymerization reaction in an aqueous solvent described later for preparing poly(meth) acrylic acid polymers (polymers (1) and (2)), followed by purification such as removal of impurities. In terms of production efficiency, production without purification is preferable. Moreover, the poly(meth)acrylic acid polymer composition of the present invention includes a composition prepared from the resulting polymer solution diluted with a small amount of water (e.g., 1 to 400 parts by mass of water relative to 100 parts by mass of the resulting polymer solution), concentrated, or dried after polymerization, for the purpose of facilitating the handleability of the composition.

The poly(meth)acrylic acid polymer that is an essential component in the present invention and the poly(meth) acrylic acid polymer composition of the present invention are preferably produced by such a production method.

<Polymerization Step>
(Monomer Composition)

The poly(meth)acrylic acid polymer (and polymer composition) is preferably produced by a production method including the step of polymerizing a monomeric component containing a (meth)acrylic acid (salt) (also referred to as polymerization step).

In the polymerization step, other monomers, in addition to the (meth)acrylic acid (salt), may be copolymerized. In such a case, the acid equivalent amount of the (meth)acrylic acid (salt) is preferably at least 90% by mass based on 100% by mass of the sum of monomeric components (total amount of the (meth)acrylic acid (salt) and other monomer(s)). If the amount is at least 90% by mass, the resulting polymer composition used as a fiber crosslinking agent provides the treated fiber with better water absorption properties.

As mentioned earlier, the acid equivalent amount is obtained by calculating the mass ratio of an acid-form monomer corresponding to the salt-form monomer. In the case of sodium (meth)acrylate, for example, the mass ratio is calculated as (meth)acrylic acid. The mass ratio(s) of the other monomer(s) are similarly calculated as the acid equivalent mass ratio(s).

(Polymerization Solvent)

The polymerization step is preferably performed in a solvent. It is to be noted that polymerization can be performed without using a solvent. In the case of using a solvent, preferable examples of the solvent include water and a mixed solvent containing water and organic solvents. From the standpoint of using the resulting polymer composition for various applications, the amount of the organic solvents used is preferably as small as possible. The solvent is preferably water.

(Polymerization Initiator)

The polymerization step is preferably performed in the presence of a polymerization initiator (also referred to as an initiator).

A known polymerization initiator may be used, and preferable examples thereof include: persulfuric acid (salts) such as sodium persulfate, potassium persulfate, and ammonium persulfate; hydrogen peroxide; azo compounds such as dimethyl 2,2'-azobis(2-methylpropionate), 2,2'-azobis(2-amidinopropane) hydrochloride, 4,4'-azobis-4-cyanovaleate, azobisisobutyronitrile, 2,2'-azobis(4-methoxy-2,4-dimethylvaleronitrile); and organic peroxides such as benzoyl peroxide, lauroyl peroxide, peracetic acid, di-t-butylperoxide, and cumene hydroperoxide. Each of these polymerization initiators may be used alone, or two or more of these may be used in the form of a mixture. Preferably, one polymerization initiator is used alone because the molecular weight distribution of the polymer is likely to be narrowed.

The amount of the polymerization initiator is, unless otherwise specified, preferably at most 15 g and more preferably 0.1 to 12 g per mol of all the monomeric components.

Among the polymerization initiators, a persulfuric acid (salt) is preferably used in consideration of the penetration speed, water retention, and absorption properties of the treated fiber in the case where the resulting polymer composition is used as a fiber crosslinking agent. In the case of using a persulfuric acid (salt), the amount thereof is preferably at most 1.9 g per mol of all the monomeric components, especially in consideration of the absorption properties. The amount is more preferably at most 1.6 g, still more preferably at most 1.2 g, and particularly preferably at most 1.1 g. The amount is preferably at least 0.1 g and more preferably at least 0.5 g per mol of all the monomeric components.

(Chain Transfer Agent)

In the polymerization step, a chain transfer agent is preferably used together with the polymerization initiator.

The chain transfer agent is not limited as long as the molecular weight thereof can be adjusted, and a known chain transfer agent may be used. Specific examples thereof include: thiol chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecyl mercaptan, octyl mercaptan, and butyl thioglycolate; halides such as carbon tetrachloride, methylene chloride, bromoform, and bromotrichloroethane; secondary alcohols such as isopropanol and glycerin; hypophosphorous acid, hypophosphorous acid salts, and hydrates of these; and bisulfite (salts) and compounds which may generate bisulfite (salts) (e.g., bisulfate (salts), pyrosulfite (salts), dithionite (salts), sulfite (salts)). Each of these chain transfer agents may be used alone, or two or more of these may be used in combination.

The amount of the chain transfer agent is, unless otherwise specified, preferably 1 to 20 g per mol of all the monomeric components. If the amount is less than 1 g, the molecular weight may not be controlled. If the amount is more than 20 g, the chain transfer agent may be left or the pure polymer content may be lowered. The amount is more preferably 2 to 15 g.

In production of the polymer (and the polymer composition) (1), the polymer (and the polymer composition) (1) is preferably produced by polymerization of a monomeric component containing a (meth)acrylic acid (salt) in the presence of a bisulfite (salt) and/or a compound which may generate a bisulfite (salt) because sulfonic acid (salt) groups are comparatively easily introduced into the poly(meth) acrylic acid polymers. In such a case, the bisulfite (salt) mainly serves as a chain transfer agent. Use of the bisulfite (salt) as a chain transfer agent allows introduction of sulfonic acid (salt) groups into at least one end of the main chain of the poly(meth)acrylic acid polymers.

In the above case, from the standpoint of reducing residues left after introduction into the poly(meth)acrylic acid polymers, the amount used of the bisulfite (salt) and/or the compound which may generate a bisulfite (salt) is preferably at most 10 g, more preferably at most 7 g, and still more preferably at most 6 g per mol of all the monomeric components. From the standpoint of introducing a predetermined amount of sulfonic acid (salt) groups into the poly (meth)acrylic acid polymers, the lower limit of the amount used is preferably at least 0.5 g, and more preferably at least 1 g per mol of all the monomeric components.

In the case where the amount of the bisulfite (salts) and/or a compound which may generate bisulfite (salts) is not more than the above upper limit, the resulting polymer composition used as a fiber crosslinking agent further improves the absorption speed and the water retention of the treated fiber.

In production of the polymer (and the polymer composition) (2), the polymer (and the polymer composition) (2) is preferably produced by polymerization of a monomeric component containing (meth)acrylic acid (salt) in the presence of a hypophosphorous acid (salt) because hypophosphorous acid (salt) groups are comparatively easily introduced into the poly(meth)acrylic acid polymers. In such a case, the hypophosphorous acid (salt) mainly serves as a chain transfer agent. The hypophosphorous acid (salt) used as a chain transfer agent allows introduction of hypophosphorous acid (salt) groups into the poly(meth)acrylic acid polymers.

In the above case, from the standpoint of reducing the residues left after introduction into the poly(meth)acrylic acid polymers, the amount used of the hypophosphorous acid (salt) is preferably at most 10 g, more preferably at most 7 g, and still more preferably at most 6 g per mol of all the monomeric components. From the standpoint of introducing a predetermined amount of hypophosphorous acid (salt) groups into the poly(meth)acrylic acid polymers, the lower limit of the amount used is preferably at least 0.5 g and more preferably at least 1 g per mol of all the monomeric components.

In the case where the amount of the hypophosphorous acid (salt) is not more than the above upper limit, the amount of hypophosphorous acid (salt) not contributing to chain transfer (the hypophosphorous acid (salt) not introduced into polymers) is reduced. Owing to this, the resulting polymer composition used as a fiber crosslinking agent is able to further improve the water absorption properties of the treated fiber.

In the above case, since the hypophosphorous acid (salt) is likely to be introduced into the poly(meth)acrylic acid polymers efficiently (the introduction rate of the hypophosphorous acid (salt) is likely to be improved), the following method is preferably employed as a method of adding the hypophosphorous acid (salt) into a reactor (reaction vessel).

That is, at least part of the hypophosphorous acid (salt) to be used is fed into a reactor (reaction vessel) before the polymerization reaction (also referred to as initial feed). In particular, the proportion of the hypophosphorous acid (salt) added before the polymerization reaction is preferably 2 to 80 mol % based on 100 mol % of the total amount of the hypophosphorous acid (salts) to be used. The proportion thereof is more preferably 5 to 60 mol %, and still more preferably 10 to 30 mol %.

The phrase "before the polymerization reaction" herein refers to the time point before the start of the polymerization reaction. The phrase "the start of the polymerization reaction" refers to the time point when part or all of the monomers to be used and part of or the whole polymerization initiator to be used are both fed into the reactor (reaction vessel).

(Cracking Catalyst, Reducing Compound)

In the polymerization step, a cracking catalyst and a reducing compound (correctively referred to as reaction promoters) for the polymerization initiator may be used, in addition to the polymerization initiator and the like. In other words, the reaction promoters may be added to the polymerization system.

Preferable examples of the compound usable as a cracking catalyst and a reducing compound for the polymerization initiator include heavy metal ions (or heavy metal salts). In other words, the polymerization reaction in the polymerization step is preferably performed in the presence of a heavy metal ion (or heavy metal salt) in addition to the polymerization initiator.

The heavy metal ions herein refer to metals having a specific gravity of at least 4 g/cm$^3$.

Preferable examples of the heavy metal ions include iron, cobalt, manganese, chromium, molybdenum, tungsten, copper, silver, gold, lead, platinum, iridium, osmium, palladium, rhodium, and ruthenium. One or two or more of these may be used. In particular, iron is preferably used.

The ionic valency of the heavy metal ion is not limited. In the case where iron is used as a heavy metal, for example, iron ions in the polymerization initiator may be $Fe^{2+}$, $Fe^{3+}$, or a combination of these.

The heavy metal ion is preferably added to the polymerization system in the form of a solution containing a heavy metal salt (also referred to as a heavy metal compound) to be present in the system. In particular, a water solution or aqueous solution containing heavy metal salts is preferably added. The heavy metal salt used may be appropriately selected in accordance with the polymerization initiator to be used, provided that the heavy metal salt contains the heavy metal ion desired to be contained in the polymerization initiator. For example, in the case where iron is used as a heavy metal ion, preferably used are heavy metal salts such as Mohr's salt $(Fe(NH_4)_2(SO_4)_2 \cdot 6H_2O)$, ferrous sulfate/heptahydrate, ferrous chloride, and ferric chloride. In the case where manganese is used as a heavy metal ion, manganese chloride or the like is suitably used. Each of these heavy metal salts is a water-soluble compound, and therefore is used in the form of an aqueous solution and has excellent handleability.

The solvent of the solution containing the heavy metal salt is preferably water but is not limited to water. An organic solvent may be used solely or in combination with water.

In the case where a heavy metal ion is used in the polymerization step, the amount thereof is preferably 0.1 to 10 ppm relative to the total mass of the polymerization reaction liquid after addition of all the monomeric components to be used. If the amount is less than 0.1 ppm, the effect owing to the heavy metal ions may not be exerted sufficiently. In contrast, if the amount of the heavy metal ions is more than 10 ppm, the resulting polymer may not have a favorable hue.

Examples of the cracking catalyst for the polymerization initiator, other than the heavy metal ions (or heavy metal salts), include: metal halides such as lithium chloride and lithium bromide; metal oxides such as titanium oxide and silicon dioxide; metal salts of inorganic acids such as hydrochloric acid, hydrobromic acid, perchloric acid, sulfuric acid, and nitric acid; carboxylic acids (e.g., formic acid, acetic acid, propionic acid, butyric acid, isobutyric acid, benzoic acid), and esters and metal salts thereof; heterocyclic amines (e.g., pyridine, indole, imidazole, carbazole) and derivatives thereof. One or two or more of these cracking catalysts may be used.

Examples of the reducing compound other than the heavy metal ions (or heavy metal salts) include: inorganic compounds such as boron trifluoride ether adducts and perchloric acid; sulfur-containing compounds such as sulfur dioxide, sulfite salt, sulfuric acid ester, bisulfite salt, thiosulfuric acid salt, sulphoxylate salt, benzenesulfinic acid and its substituents, and homologues of cyclic sulfinic acids (e.g., paratoluenesulfinic acid); compounds exemplified as the thiol chain transfer agents; nitrogen-containing compounds such as hydrazine, β-hydroxy ethyl hydrazine, and hydroxylamine; aldehydes such as formaldehyde, acetaldehyde, propionaldehyde, n-butyl aldehyde, isobutyl aldehyde, and isovaleric aldehyde; and ascorbic acid. One or two or more of these reducing compounds may be used.

In the polymerization step, a pH regulator and a buffer may be optionally used, in addition to the polymerization initiator, chain transfer agent, and reaction promoter.

(Polymerization Concentration)

In the polymerization step, the polymerization reaction is preferably performed under the conditions that the solid content concentration (referring to the concentration of the nonvolatile components in the polymer solution) after addition of all the monomeric components to be used is 30 to 70% by mass based on 100% by mass of the polymerization solution. In such a case, the resulting polymer composition used as a fiber crosslinking agent may further improve the water absorption properties of the treated fiber. The solid content concentration is more preferably 40 to 65% by mass, and still more preferably 50 to 60% by mass. The solid content concentration of the polymer solution is measured by a later-described method.

(Polymerization Temperature, Polymerization Pressure)

The temperature during the polymerization reaction is preferably at least 70° C. The temperature is more preferably 75° C. to 110° C., and still more preferably 80° C. to 105° C. In the case where the polymerization reaction is performed at temperatures within such a range, the residual monomeric components are further reduced, and the resulting polymer composition used as a fiber crosslinking agent may provide the treated fiber with further improved water absorption properties.

The temperature during the polymerization needs not to be kept constant during progress of the polymerization reaction. For example, the temperature is an ambient temperature at the start of the polymerization reaction, increased to the set temperature in an appropriate heating time or at an appropriate rate of temperature rise, and kept at that set temperature. Alternatively, in accordance with the method of dropwise addition of monomeric components and initiators, the temperature may be changed (temperature rise or temperature fall) chronologically during the progress of the polymerization reaction.

In the polymerization step, the reaction system may be under normal pressure (atmospheric pressure), reduced pressure, or elevated pressure. In terms of the molecular weight of the resulting polymers, the polymerization reaction is preferably performed under normal pressure, or alternatively, under elevated pressure with the reaction system enclosed. In consideration of the equipment such as pressure or decompression devices, and pressure-resistant reactors and pipes, the polymerization reaction is preferably performed under normal pressure (atmospheric pressure). The atmosphere in the reaction system may be air atmosphere, and is preferably inert atmosphere. For example, the atmosphere in the system is preferably substituted with an inert gas such as nitrogen, before the start of the polymerization.

(Method of Adding Polymerization Materials)

In the polymerization step, all the monomeric components to be used may be added to the reactor at once. Preferably, part or all of the monomeric components is added to the reactor sequentially. More preferably, part or all of the monomeric components is added to the reactor continuously. Sequential addition of part or all of the monomeric components allows control of heat generation. In addition, the monomer concentration of the reaction system can be controlled during the polymerization reaction. As a result, the molecular weight distribution of the polymer can be narrowed. The monomeric components may be added solely, or may be dissolved in a solvent such as water or mixed with other raw materials before addition.

The whole polymerization initiator may be added at once. Preferably, part of or the whole polymerization initiator is added to the reactor sequentially. More preferably, part of or the whole polymerization initiator is added to the reactor continuously. Sequential addition of part of or the whole polymerization initiator allows control of the polymerization initiator concentration of the reaction system during the polymerization reaction. As a result, the molecular weight distribution of the polymer can be narrowed. In the case of a batch polymerization reaction, addition of the polymerization initiator is preferably finished when all the monomer components are added or after addition of all the monomer components. More preferably, addition of the polymerization initiator is finished 1 to 30 minutes after addition of all the monomers. In such a case, the residual monomer components may be further reduced. The polymerization initiator may be added solely, and is preferably dissolved in a solvent such as water before addition.

The whole chain transfer agent may be added to the reactor at once. Preferably, part of or the whole chain transfer agent is sequentially added to the reactor. More preferably, except for the case mentioned above, part of or the whole chain transfer agent is added to the reactor continuously. Sequential addition of part of or the whole chain transfer agent allows control of the polymerization initiator concentration of the reaction system during the polymerization reaction. As a result, the molecular weight distribution of the polymer can be narrowed and a secondary reaction due to the chain transfer agent can be controlled. In the case of a batch polymerization reaction, addition of the chain transfer agent is preferably finished when all the monomer components are added or before completion of addition of all the monomer components. In such a case, the residual chain transfer agent may be further reduced and impurities are further reduced. The chain transfer agent may be added solely, and is preferably dissolved in a solvent such as water before addition.

The whole solvent may be added to the reactor at once. Preferably, at least part of the whole solvent is fed to the reactor before starting the polymerization reaction. In other words, the initial feed preferably contains at least part of the solvent.

In the case where part of the solvent is added to the reactor after starting the polymerization reaction, the solvent may be used for dissolving the polymerization initiator and the chain transfer agent for sequential addition. Alternatively, the solvent may optionally be added solely to the reactor after starting the polymerization reaction.

<Other Steps>

The production method of the poly(meth)acrylic acid polymer (composition) preferably includes the polymerization step (i.e., step of polymerizing monomer components including a (meth)acrylic acid (salt)) as an essential step, and may further include one or two or more other steps. For example, the method may include a step of neutralizing acid-form and/or partially neutralized poly(meth)acrylic acid polymer (contained in a composition) with a basic substance (neutralization step). An embodiment including such a neutralization step is also preferable.

Examples of the basic substance used in the neutralization step include: alkali metal hydroxides such as sodium hydroxide and potassium hydroxide; alkali metal carbonates such as sodium carbonate, potassium carbonate, and sodium hydrogen carbonate; alkaline earth metal compounds such as calcium hydroxide, magnesium hydroxide, and calcium oxide; organic amines such as monoethanolamine, diethanolamine, and triethanolamine; and ammonium. One or two or more of these may be used.

[Fiber Crosslinking Agent]

The above-mentioned (meth)acrylate polymer compositions (polymer compositions (1) and (2)) of the present invention are especially usable as fiber crosslinking agents. A fiber crosslinking agent containing the polymer composition (1) or (2) is another aspect of the present invention. The polymer composition (1) or (2) may be used as a fiber crosslinking agent of the present invention as it is. Alternatively, the polymer composition may be purified or mixed with other components to be formed into the fiber crosslinking agent of the present invention. Examples of the other components include known crosslinking agents, crosslinking promoters or the like.

The method of treating fiber with the fiber crosslinking agent (crosslinking method) is not limited, and a known method may be employed. Specifically, a crosslinking method preferably includes the steps of: (i) contacting fiber with the poly(meth)acrylic acid polymer composition (polymer composition (1) or (2)) of the present invention in the presence of a solvent; and (ii) drying the fiber.

In such a crosslinking method, fiber may be subjected to a mechanical treatment for defiberization. Defiberization tends to provide the treated fiber with further enhanced water absorption properties.

The fiber used in the crosslinking method is not limited, and examples thereof include various wood pulp fibers (pulp fibers, ground wood pulp fibers, and regenerated or secondary wood pulp fibers each treated by kraft process, sulfite process, thermochemical process, or chemi-thermochemical process), other various cellulose fibers, cotton, cotton/polyester-blended fibers, wool, artificial fibers (e.g., nylon, polyester, acrylic fibers), glass fibers, carbon fibers, optical fibers, and metal fibers.

In the step (i), in the case where the poly(meth)acrylic acid polymer composition of the present invention contains a solvent, a solvent needs not to be added separately. Preferably, the amount of the solvent is preferably set to 100 to 10000 parts by mass relative to 100 parts by mass of the fiber. With the solvent within such a range, the poly(meth)acrylic acid polymer more excellently penetrates into the fiber, and the treated fiber has further enhanced water absorption properties.

The solvent preferably contains water, and is most preferably water.

The step (i) may be carried out under heating. In such a case, the temperature is suitably set to 10° C. to 80° C.

The step (i) is preferably carried out for 10 to 300 minutes.

In the step (i), the amount of the poly(meth)acrylic acid polymer composition of the present invention is preferably 0.5 to 20 parts by mass and more preferably 2 to 7 parts by mass relative to 100 parts by mass of the fiber.

In the step (ii), drying is preferably carried out under heating. The drying temperature is preferably 150° C. to 250° C.

The steps (i) and (ii) carried out in this order provides favorable crosslinked fiber with further enhanced water absorption properties.

[Crosslinked Fiber]

The fiber treated with the fiber crosslinking agent of the present invention has water absorption properties, and therefore is usable for dish cloths, towels, paper tissues, deodorant body paper, cleansing wipes, diapers, and the like. Especially, the fiber treated with the polymer composition (1) (crosslinked fiber) has a favorable hue and has a sufficient absorption speed and adequate water retention, and therefore is particularly usable for applications that require these properties. The fiber treated with the polymer composition (2) (crosslinked fiber) has significantly excellent water absorption properties, and therefore is particularly usable for applications that strongly require water absorption properties. According to the present invention, in addition to these excellent properties, the fiber strength is also expected to be enhanced by fiber crosslinking. As mentioned above, the present invention is also related to the crosslinked fiber prepared by a treatment with the fiber crosslinking agent of the present invention, and the crosslinked fiber prepared by a treatment with the polymer composition (1) or (2).

The crosslinked fiber preferably has a water retention value (under high pressure) of at least 130. In such a case, the crosslinked fiber may be more suitable for various applications. The water retention value is more preferably at least 140, and still more preferably at least 150. Accordingly, an embodiment where the crosslinked fiber has a water retention value (under high pressure) of at least 150 is also a preferable embodiment of the present invention. The water retention value is further more preferably at least 160, particularly preferably at least 170, and most preferably at least 180. The upper limit thereof is not limited, and is preferably, for example, at most 1000.

The water retention value (under high pressure) is obtainable by the method mentioned later.

[Other Applications]

The (meth)acrylate polymer (composition) of the present invention is especially usable for a fiber crosslinking agent because of its excellent properties. Additionally, the (meth)acrylate polymer (composition) may be used for any appropriate other applications. Examples thereof include dispersants, coagulants, thickeners, cohesive agents, adhesives, surface-coating materials, crosslinkable compositions, and the like for various inorganic and organic materials. More specific examples include mud dispersants, metal fine particle dispersants, carbon black dispersants, detergent builders, heavy metal scavengers, scale inhibitors, metal surface-treatment agents, dyeing auxiliaries, dyeing fixers, foam stabilizers, emulsion stabilizers, ink dye dispersing agents, water-based ink stabilizers, pigment dispersants for coating materials, thickeners for coating materials, pressure sensitive adhesives, paper adhesives, stick pastes, adhesives for medical use, adhesives for patches, adhesives for facial packs, filler dispersants for resins, hydrophilizing agents for resins, coating agents for recording papers, finishing agents for ink jet papers, dispersants for photosensitive resins, antistatic agents, moisturizers, binders for fertilizers, binders for medical tablets, resin compatibility accelerators, photographic additives, cosmetic dispensing additives, hairdressing assistants, hair spray additives, and sunscreen composition additives.

Advantageous Effects of Invention

The (meth)acrylate polymer compositions of the present invention each have the above-mentioned structure, and therefore are excellent in various properties and especially usable for fiber crosslinking agents. In particular, the polymer composition (1) used as a fiber crosslinking agent maintains a favorable hue of fiber and allows the fiber to have a sufficient absorption speed and adequate water retention. The polymer composition (2) provides fiber with favorable absorption properties. Accordingly, crosslinked fiber prepared by treating fiber with such a (meth)acrylate polymer composition is notably usable for various living supplies, medical supplies, and the like.

BRIEF DESCRIPTION OF DRAWINGS

FIG. 1 is a $^1$HNMR chart of a polymer obtained in Example 1.

DESCRIPTION OF EMBODIMENTS

The present invention is described in more detail with reference to, but not limited to, the following examples. Unless otherwise specified, "parts" means "parts by mass", and "%" means "% by mass".

Analyses/measurements were conducted by the following methods.

<Measuring Conditions for Weight Average Molecular Weight and Number Average Molecular Weight (GPC)>
Device: L-7000 series from Hitachi, Ltd.
Detector: HITACHI RI Detector L-2490
Column: TSK-GEL G3000PWXL from TOSOH CORPORATION
Column temperature: 40° C.
Flow rate: 0.5 mL/min
Calibration curve: POLY SODIUM ACRYLATE STANDARD from Sowa Kagaku Co., Ltd.
Eluate: Solution obtained by diluting a mixture of sodium dihydrogen phosphate dodecahydrate/disodium hydrogen phosphate dihydrate (34.5 g/46.2 g) with 5000 g of pure water <Measurement of Monomeric Components in the Polymer Composition, and Measurement of a Bisulfite (Salt)-Added (Meth)Acrylic Acid (Salt) in the Polymer Composition>

Each measurement was performed by liquid chromatography under the following conditions.
Measurement device: L-7000 series from Hitachi, Ltd.
Detector: UV Detector L-7400 from Hitachi, Ltd.
Column: SHODEX RSpak DE-413 from Hitachi, Ltd.
Temperature: 40.0° C.
Eluate: 0.1% phosphoric acid aqueous solution
Flow rate: 1.0 ml/min <Analysis of Sulfonic Acid Groups at Main Chain Ends in Polymers>

Polymers (aqueous solution) adjusted to have a pH of 1 is dried under reduced pressure at ambient temperature for removal of water, and then subjected to $^1$HNMR measurement with use of heavy water as a solvent. Introduction of a sulfonic acid group to a main chain end of the polymer is confirmed by the presence of a peak at 2.7 ppm which is derived from the introduction.

<Measurement of the Hypophosphorous Acid (Salt) in the Polymer Composition>

The concentration of the hypophosphorous acid (salt) is analyzed by ion chromatography under the following conditions.
Device: 762 Interface from Metrohm
Detector: 732 IC Detector from Metrohm
Ion analysis type: Suppressor method
Column: Shodex IC SI-90 4E
Guard column: Shodex SI-90 G
Column temperature: 40° C.
Eluate: NaHCO$_3$ water (2 g of NaHCO$_3$ diluted in 2000 g of water)
Flow rate: 1.0 mL/min <Analysts of Hypophosphorous Acid (Salt) Groups in the Polymers>

The hypophosphorous acid (salt) groups are determined by $^{31}$P-NMR measurement.

The ratio of the hypophosphorous acid (salt) groups to the whole phosphorous compounds in the polymers is determined based on the integral intensity ratio of $^{31}$P-NMR. Further, the amount (% by mass) of the hypophosphorous acid (salt) groups relative to 100% by mass of the polymers (introduction rate of hypophosphorous acid (salt) groups) is calculated based on the amounts used of monomers and hypophosphorous acid (salts). Measurement conditions for $^{31}$P-NMR:

Polymers to be measured are dried under reduced pressure at ambient temperature. The resulting solids are dissolved in heavy water (product of Aldrich) to 10% by mass and subjected to measurement using a Unity Plus-400 (product of Varian, 400 MHz, pulse sequence: s2pu1, measurement interval: 10.000 seconds, pulse: 45.0 degrees, acquisition time: 0.800 seconds, total number of times: 128).

<Measurement of Solids Content of the Polymer Composition (Polymer Solution)>

In nitrogen atmosphere, the polymer composition (1.0 g of polymer composition +3.0 g of water) is left in an oven heated to 110° C. for two hours for the drying treatment. The solids content (%) and the volatile content (%) are calculated from the change in weight of the polymer composition before and after the drying treatment.

<Measurement of the Water Retention of the Crosslinked Fiber>

An amount of 1.0 part of pulp fiber (from Nippon Paper Industries Co., Ltd.) and 0.04 part of the polymer composition (4% by mass in polymers, i.e., the amount of polymer per part of pulp fiber is 4% by mass) are placed in a container that contains 10 parts of distilled water, so that the pulp is swelled. After standing for two hours, the contents become homogenous and are dried by hot air at 80° C. for 30 minutes. Then, a heat treatment at 180° C. is performed thereon for 10 minutes. After cooling, the treated pulp fiber is again swelled with pure water in an amount beyond the absorption limit thereof. The wet pulp fiber is collected on a filter and transferred to an 80-mesh wire basket that is fixed at about 1 1/2 inches above the 60 mesh-screen bottom of a centrifuging tube. The tube is covered with a plastic cover. The treatments under the following two conditions are performed using a centrifugation device.

Condition (1): 1000 rpm for 5 minutes (dehydration under low pressure)

Condition (2): 5000 rpm for 10 minutes (dehydration under high pressure)

The centrifuged fiber is taken out of the basket and weighed. The weighed fiber is again dried at 105° C. until the weight becomes constant, and then again weighed. The water retention is calculated by the following formula:

Water retention={(mass of wet pulp)–(mass of dried pulp)}/(mass of dried pulp)×100.

<Measurement of the Absorption Speed of the Crosslinked Fiber>

A No. 1 filter paper from Toyo Roshi Kaisha, Ltd. is cut into a rectangle (1 cm in width and 10 cm in length) as a test paper. A line is drawn at 1 cm and 6 cm from the edge of the test paper.

The polymer aqueous solution is diluted with pure water to a solids content of 7% as a test liquid. An amount of 20 g of the test liquid is scaled and fed to a 100-cc beaker and the liquid temperature is controlled to 25° C. The test paper is immersed in the test liquid to 1 cm from the edge. The time needed for the liquid to reach the line at 6 cm (penetration time for 5 cm of test paper in seconds) is measured with a stop watch. The measured time is the penetration speed.

<Measurement of The Hue (Brightness) of The Crosslinked Fiber>

A No. 5C filter paper from Toyo Roshi Kaisha, Ltd. is immersed in a test liquid prepared by diluting the polymer aqueous solution with pure water to a solids content of 20%, for 10 minutes. The immersed filter paper is taken out of the liquid and put on a kimtowel so that the excessive test liquid is removed, thereby preparing a test paper for brightness test. The test paper is placed in a hot-air drying apparatus at 150° C. for 10 minutes, and then cooled in a desiccator to 25° C. After cooling, the b value indicating the brightness is measured with a Spectro Color Meter SE2000 from NIPPON DENSHOKU INDUSTRIES CO., LTD. The measured b value is regarded as the brightness. A smaller b value indicates higher brightness.

EXAMPLE 1

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, with stirring, the reaction system maintained at 85° C. was mixed with 900 g (10.0 mol) of a 80% acrylic acid aqueous solution (hereinafter, also abbreviated as 80% AA), 133.3 g (2.0 g/mol relative to the amount of monomers fed (the amount of monomers fed means the amount of all the monomers fed, and the same shall apply hereafter)) of a 15% sodium persulfate aqueous solution (hereinafter, also abbreviated as 15% NaPS), and 200 g (7.0 g/mol relative to the amount of monomers fed) of a 35% sodium bisulfite aqueous solution (hereinafter, also abbreviated as 35% SBS) each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, the reaction solution was cooled to 50° C.

The resulting polymer aqueous solution (polymer composition) was used for analysis of the weight average molecular weight (Mw) and the hypophosphorous acid (salt) content (ppm) of the polymer composition, measurement of the amount (% by mass) of the bisulfite (salt)-added acrylic acid (salt), and determination of the presence of a terminal sulfonic acid (salt) group. Table 1 shows the results.

EXAMPLE 2

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, under stirring, the reaction system maintained at 85° C. was mixed with 900 g (10.0 mol) of a 80% acrylic acid aqueous solution (80% AA), 133.3 g (2.0 g/mol relative to the amount of monomers fed) of a 15% sodium persulfate aqueous solution (15% NaPS), and 286 g (10.0 g/mol relative to the amount of monomers fed) of a 35% sodium bisulfite aqueous solution (35% SBS), each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, the reaction solution was cooled to 50° C.

The resulting polymer aqueous solution was subjected to the similar measurement and analysis as in Example 1. Table 1 shows the results.

EXAMPLE 3

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, under stirring, the reaction system maintained at 85° C. was mixed with 900 g (10.0 mol) of a 80% acrylic acid aqueous solution (80% AA), 133.3 g (2.0 g/mol relative to the amount of monomers fed) of a 15% sodium persulfate aqueous solution (15% NaPS), and 429 g (15.0 g/mol relative to the amount of monomers fed) of a 35% sodium bisulfite aqueous solution (35% SBS) each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, the reaction solution was cooled to 50° C.

The resulting polymer aqueous solution was subjected to the similar measurement and analysis as in Example 1. Table 1 shows the results.

EXAMPLE 4

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, under stirring, the reaction system maintained at 85° C. was mixed with 900 g (10.0 mol) of a 80% acrylic acid aqueous solution (80% AA), 133.3 g (2.0 g/mol relative to the amount of monomers fed) of a 15% sodium persulfate aqueous solution (15% NaPS), and 143 g (5.0 g/mol relative to the amount of monomers fed) of a 35% sodium bisulfite aqueous solution (35% SBS) each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, the reaction solution was cooled to 50° C.

The resulting polymer aqueous solution was subjected to the similar measurement and analysis as in Example 1. Table 1 shows the results.

EXAMPLE 5

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, under stirring, the reaction system maintained at 85° C. was mixed with 900 g (10.0 mol) of a 80% acrylic acid aqueous solution (hereinafter, also abbreviated as 80% AA), 133.3 g (2.0 g/mol relative to the amount of monomers fed (the amount of monomers fed means the amount of all the monomers fed, and the same shall apply hereafter)) of a 15% sodium persulfate aqueous solution (hereinafter, also abbreviated as 15% NaPS), and 200 g (7.0 g/mol relative to the amount of monomers fed) of a 35% sodium bisulfite aqueous solution (hereinafter, also abbreviated as 35% SBS) each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, 4.22 g of a 45% sodium hypophosphite aqueous solution was added to the reaction liquid over 10 minutes. Then, the reaction liquid was cooled to 50° C.

The resulting polymer aqueous solution was subjected to the similar measurement and analysis as in Example 1. Table 1 shows the results.

EXAMPLE 6

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, under stirring, the reaction system maintained at 85° C. was mixed with 900 g (10.0 mol) of a 80% acrylic acid aqueous solution (80% AA), 133.3 g (2.0 g/mol relative to the amount of monomers fed) of a 15% sodium persulfate aqueous solution (15% NaPS), and 286 g (10.0 g/mol relative to the amount of monomers fed) of a 35% sodium bisulfite aqueous solution (35% SBS) each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, 4.41 g of a 45% sodium hypophosphite aqueous solution was added to the reaction liquid over 10 minutes. Then, the reaction solution was cooled to 50° C.

The resulting polymer aqueous solution was subjected to the similar measurement and analysis as in Example 1. Table 1 shows the results.

EXAMPLE 7

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, under stirring, the reaction system maintained at 85° C. was mixed with 900 g (10.0 mol) of a 80% acrylic acid aqueous solution (80% AA), 133.3 g (2.0 g/mol relative to the amount of monomers fed) of a 15% sodium persulfate aqueous solution (15% NaPS), and 429 g (15.0 g/mol relative to the amount of monomers fed) of a 35% sodium bisulfite aqueous solution (35% SBS) each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, 23.7 g of a 45% sodium hypophosphite aqueous solution was added to the reaction liquid over 10 minutes. Then, the reaction liquid was cooled to 50° C.

The resulting polymer aqueous solution was subjected to the similar measurement and analysis as in Example 1. Table 1 shows the results.

EXAMPLE 8

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, under stirring, the reaction system maintained at 85° C. was mixed with 900 g (10.0 mol) of a 80% acrylic acid aqueous solution (80% AA), 133.3 g (2.0 g/mol relative to the amount of monomers fed) of a 15% sodium persulfate aqueous solution (15% NaPS), and 143 g (5.0 g/mol relative to the amount of monomers fed) of a 35% sodium bisulfite aqueous solution (35% SBS) each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, 4.09 g of a 45% sodium hypophosphite aqueous solution was added to the reaction liquid over 10 minutes. Then, the reaction liquid was cooled to 50° C.

The resulting polymer aqueous solution was subjected to the similar measurement and analysis as in Example 1. Table 1 shows the results.

EXAMPLE 9

A 5-L SUS separable flask equipped with a reflux condenser, a stirrer, a thermometer, and a feed line was charged with 665.7 g of pure water and 0.0164 g of Mohr's salt (initial feed). The mixture was heated to 85° C. with stirring.

Then, under stirring, the reaction system maintained at 85° C. was mixed with 900 g (10.0 mol) of a 80% acrylic acid aqueous solution (80% AA), 133.3 g (2.0 g/mol relative to the amount of monomers fed) of a 15% sodium persulfate aqueous solution (15% NaPS), and 85.7 g (3.0 g/mol relative to the amount of monomers fed) of a 35% sodium bisulfite aqueous solution (35% SBS) each added dropwise from different nozzles. The drop time was 180 minutes for 80% AA, 170 minutes for 35% SBS, and 200 minutes for 15% NaPS. During the above time, they were added dropwise at a constant rate continuously.

After the dropwise addition, the reaction solution was further maintained at 85° C. for 30 minutes for aging, thereby completing the polymerization reaction. After completion of the polymerization reaction, 3.97 g of a 45% sodium hypophosphite aqueous solution was added to the reaction liquid over 10 minutes. Then, the reaction liquid was cooled to 50° C.

The resulting polymer aqueous solution was subjected to the similar measurement and analysis as in Example 1. Table 1 shows the results.

COMPARATIVE EXAMPLE 1

A polymer aqueous solution was not used, and pure water in the same amount was used for measurement of properties. Table 1 shows the results.

COMPARATIVE EXAMPLE 2

A 2.5-L SUS separable flask equipped with a reflux condenser, a stirrer, and a feed line was charged with 437.8 g of pure water (initial feed) and heated to 100° C. with stirring.

Then, under stirring, the reaction system maintained at the boiling temperature (100° C. to 103° C.) was mixed with 900 g (10.0 mol) of an 80% acrylic acid aqueous solution (80% AA) and 533.3 g (8 g/mol relative to the amount of monomers fed) of a 15% sodium persulfate aqueous solution (15% NaPS) each added dropwise from different nozzles. The drop time was 180 minutes for 80% AA and 185 minutes for 15% NaPS. During the above time, they were added dropwise at a constant rate continuously.

After the dropwise addition, the reaction solution was further maintained at 90° C. for 30 minutes for aging, thereby completing the polymerization reaction. After completion of the polymerization reaction, 2.08 g of a 45% sodium hypophosphite aqueous solution was added to the reaction liquid over 10 minutes. Then, the reaction liquid was cooled to 50° C.

The resulting polymer aqueous solution was subjected to the similar measurement and analysis as in Example 1. Table 1 shows the results.

COMPARATIVE EXAMPLE 3

A 2.5-L SUS separable flask equipped with a reflux condenser, a stirrer, and a feed line was charged with 437.8 g of pure water (initial feed) and heated to 100° C. with stirring.

Then, under stirring, the reaction system maintained at the boiling temperature (100° C. to 103° C.) was mixed with 900 g (10.0 mol) of a 80% acrylic acid aqueous solution (80% AA), 333.3 g (5 g/mol relative to the amount of monomers fed) of a 15% sodium persulfate aqueous solution (15% NaPS), and 8 g (0.36 g/mol relative to the amount of monomers fed) of 45% SHP, each added dropwise from different nozzles. The drop time was 180 minutes for 80% AA, 200 minutes for 45% SHP, and 185 minutes for 15% NaPS. During the above time, they were added dropwise at a constant rate continuously.

After the dropwise addition, the reaction solution was further maintained at 90° C. for 30 minutes for aging, thereby completing the polymerization reaction. After completion of the polymerization reaction, the reaction liquid was cooled to 50° C.

The resulting polymer aqueous solution was subjected to the similar measurement and analysis as in Example 1. Table 1 shows the results.

The polymer aqueous solutions (polymer compositions) obtained in Examples 1 to 9 and Comparative Examples 1 to 3 were subjected to measurement of the brightness, penetration speed, and water retention of the crosslinked fiber by the methods mentioned above. Table 1 shows the results.

TABLE 1

| Example | Mw | Amount of bisulfite (salt)-added acrylic acid (salt) (% by mass) | Hypophosphorous acid (salt) content of polymer composition (ppm) | Presence of terminal sulfonic acid (salt) group | Brightness after treatment at 180° C. for 10 minutes | Penetration speed (seconds/5 cm) 7% aqueous solution | Water retention value after centrifugation (under high pressure) at 5000 rpm for 10 minutes |
|---|---|---|---|---|---|---|---|
| Example 1 | 3000 | 2.2 | 0 | Present | 2.5 | 292 | 188 |
| Example 2 | 1600 | 4.8 | 0 | Present | 2.5 | 263 | 165 |
| Example 3 | 1400 | 6.2 | 0 | Present | 2.4 | 230 | 151 |
| Example 4 | 6000 | 1.4 | 0 | Present | 2.6 | 330 | 180 |
| Example 5 | 3000 | 2.1 | 1000 | Present | 2.3 | 290 | 210 |
| Example 6 | 1600 | 4.6 | 1000 | Present | 2.3 | 259 | 205 |
| Example 7 | 1400 | 6.1 | 5000 | Present | 2.0 | 225 | 202 |
| Example 8 | 6000 | 1.2 | 1000 | Present | 2.4 | 325 | 196 |
| Example 9 | 15000 | 0.93 | 1000 | Present | 2.4 | 450 | 230 |
| Comparative Example 1 | — | 0 | 0 | — | 7.8 | 90 | 74 |
| Comparative Example 2 | 5000 | 0 | 500 | Absent | 3.2 | 315 | 120 |
| Comparative Example 3 | 5000 | 0 | 100 | Absent | 3.5 | 321 | 128 |

Based on the comparison between the examples and the comparative examples in Table 1, in the case where the polymer composition (1) of the present invention is used as a fiber crosslinking agent, the brightness (hue), penetration speed, and water retention of the crosslinked fiber are significantly better than those in the case of using a conventional polymer composition.

EXAMPLE 10

A 2.5-L SUS separable flask equipped with a reflux condenser, a stirrer, and a feed line was charged with 437.8 g of pure water and 15.6 g (0.7 g/mol relative to the amount of monomers fed) of a 45% sodium hypophosphite aqueous solution (hereinafter, also abbreviated as 45% SHP) (initial feed). The mixture was heated to 100° C. with stirring.

Then, under stirring, the reaction system maintained at the boiling temperature (100° C. to 103° C.) was mixed with 900 g (10.0 mol) of a 80% acrylic acid aqueous solution (80% AA), 46.7 g (0.7 g/mol relative to the amount of monomers fed (the amount of monomers fed means the amount of all the monomers fed, and the same shall apply hereafter)) of a 15% sodium persulfate aqueous solution (15% NaPS), and 85.7 g (3.0 g/mol relative to the amount of monomers fed) of 45% SHP, each added dropwise from different nozzles. The drop time was 180 minutes for 80% AA, 200 minutes for 45% SHP, and 185 minutes for 15% NaPS. During the above time, they were added dropwise at a constant rate continuously.

After the dropwise addition, the reaction solution was further maintained at 90° C. for 30 minutes for aging, thereby completing the polymerization reaction. After completion of the polymerization reaction, the reaction solution was cooled to 50° C.

The resulting polymer aqueous solution (polymer composition) was used for analysis of the weight average molecular weight, the hypophosphorous acid (salt) content of the polymer aqueous solution, and the amount of the hypophosphorous acid (salt) groups introduced into the polymers. Table 2 shows the results.

EXAMPLE 11

A 2.5-L SUS separable flask equipped with a reflux condenser, a stirrer, and a feed line was charged with 437.8 g of pure water and 15.6 g (0.7 g/mol relative to the amount of monomers fed) of a 45% sodium hypophosphite aqueous solution (45% SHP) (initial feed). The mixture was heated to 100° C. with stirring.

Then, under stirring, the reaction system maintained at the boiling temperature (100° C. to 103° C.) was mixed with 900 g (10.0 mol) of a 80% acrylic acid aqueous solution (80% AA), 46.7 g (0.7 g/mol relative to the amount of monomers fed) of a 15% sodium persulfate aqueous solution (15% NaPS), and 85.7 g (3.0 g/mol relative to the amount of monomers fed) of 45% SHP, each added dropwise from different nozzles. The drop time was 180 minutes for 80% AA, 200 minutes for 45% SHP, and 185 minutes for 15% NaPS. During the above time, they were added dropwise at a constant rate continuously.

After the dropwise addition, the reaction solution was further maintained at 90° C. for 30 minutes for aging, thereby completing the polymerization reaction. After completion of the polymerization reaction, the reaction solution was cooled to 50° C.

The resulting polymer aqueous solution was subjected to the similar measurement and analysis as in Example 10. Table 2 shows the results.

EXAMPLE 12

A 2.5-L SUS separable flask equipped with a reflux condenser, a stirrer, and a feed line was charged with 552.5 g of pure water and 6.7 g (0.3 g/mol relative to the amount of monomers fed) of a 45% sodium hypophosphite aqueous solution (45% SHP) (initial feed). The mixture was heated to 100° C. with stirring.

Then, under stirring, the reaction system maintained at the boiling temperature (100° C. to 103° C.) was mixed with 900 g (10.0 mol) of a 80% acrylic acid aqueous solution (80% AA), 66.7 g (1.0 g/mol relative to the amount of monomers fed) of a 15% sodium persulfate aqueous solution (15% NaPS), and 20 g (0.7 g/mol relative to the amount of monomers fed) of 45% SHP, each added dropwise from different nozzles. The drop time was 180 minutes for 80% AA, 200 minutes for 45% SHP, and 185 minutes for 15% NaPS. During the above time, they were added dropwise at a constant rate continuously.

After the dropwise addition, the reaction solution was further maintained at 90° C. for 30 minutes for aging, thereby completing the polymerization reaction. After completion of the polymerization reaction, the reaction solution was cooled to 50° C.

The resulting polymer aqueous solution was subjected to the similar measurement and analysis as in Example 10. Table 2 shows the results.

EXAMPLE 13

A 2.5-L SUS separable flask equipped with a reflux condenser, a stirrer, and a feed line was charged with 552.5 g of pure water and 6.7 g (0.3 g/mol relative to the amount of monomers fed) of a 45% sodium hypophosphite aqueous solution (45% SHP) (initial feed). The mixture was heated to 100° C. with stirring.

Then, under stirring, the reaction system maintained at the boiling temperature (100° C. to 103° C.) was mixed with 900 g (10.0 mol) of a 80% acrylic acid aqueous solution (80% AA), 66.7 g (1.0 g/mol relative to the amount of monomers fed) of a 15% sodium persulfate aqueous solution (15% NaPS), and 40 g (1.4 g/mol relative to the amount of monomers fed) of 45% SHP, each added dropwise from different nozzles. The drop time was 180 minutes for 80% AA, 200 minutes for 45% SHP, and 185 minutes for 15% NaPS. During the above time, they were added dropwise at a constant rate continuously.

After the dropwise addition, the reaction solution was further maintained at 90° C. for 30 minutes for aging, thereby completing the polymerization reaction. After completion of the polymerization reaction, the reaction solution was cooled to 50° C.

The resulting polymer aqueous solution was subjected to the similar measurement and analysis as in Example 10. Table 2 shows the results.

COMPARATIVE EXAMPLE 4

A polymer aqueous solution was not used, and pure water in the same amount as that of the polymer aqueous solution in Example 10 was used for measurement of properties in the same manner as in Example 10. Table 2 shows the results.

COMPARATIVE EXAMPLE 5

A 2.5-L SUS separable flask equipped with a reflux condenser, a stirrer, and a feed line was charged with 437.8 g of pure water (initial feed) and heated to 100° C. with stirring.

Then, under stirring, the reaction system maintained at the boiling temperature (100° C. to 103° C.) was mixed with 900 g (10.0 mol) of a 80% acrylic acid aqueous solution (80% AA) and 533.3 g (8 g/mol relative to the amount of monomers fed) of a 15% sodium persulfate aqueous solution (15% NaPS) each added dropwise from different nozzles. The drop time was 180 minutes for 80% AA and 185 minutes for 15% NaPS. During the above time, they were added dropwise at a constant rate continuously.

After the dropwise addition, the reaction solution was further maintained at 90° C. for 30 minutes for aging, thereby completing the polymerization reaction.

The resulting polymer aqueous solution was subjected to the similar measurement and analysis as in Example 10. Table 2 shows the results.

COMPARATIVE EXAMPLE 6

A 2.5-L SUS separable flask equipped with a reflux condenser, a stirrer, and a feed line was charged with 437.8 g of pure water (initial feed) and heated to 100° C. with stirring.

Then, under stirring, the reaction system maintained at the boiling temperature (100° C. to 103° C.) was mixed with 900 g (10.0 mol) of a 80% acrylic acid aqueous solution (80% AA), 333.3 g (5 g/mol relative to the amount of monomers fed) of a 15% sodium persulfate aqueous solution (15% NaPS), and 8 g (0.36 g/mol relative to the amount of monomers fed) of 45% SHP, each added dropwise from different nozzles. The drop time was 180 minutes for 80% AA, 200 minutes for 45% SHP, and 185 minutes for 15% NaPS. During the above time, they were added dropwise at a constant rate continuously.

After the dropwise addition, the reaction solution was further maintained at 90° C. for 30 minutes for aging, thereby completing the polymerization reaction. After completion of the polymerization reaction, the reaction liquid was cooled to 50° C.

The resulting polymer aqueous solution was subjected to the similar measurement and analysis as in Example 10. Table 2 shows the results.

The polymer aqueous solutions (polymer compositions) obtained in Examples 10 to 13 and Comparative Examples 4 to 6 were subjected to measurement of the water retention of the crosslinked fiber by the method mentioned above. Table 2 shows the results.

TABLE 2

| Example | Mw | Amount of hypophosphorous acid (salt) groups introduced (% by mass) | Hypophosphorous acid (salt) content of polymer composition (ppm) | Water retention value after centrifugation (under low pressure) at 1000 rpm for 5 minutes | Water retention value after centrifugation (under high pressure) at 5000 rpm for 10 minutes | Change in water retention value between high pressure and low pressure |
|---|---|---|---|---|---|---|
| Example 10 | 5000 | 5.13 | 1100 | 412 | 171 | 0.415 |
| Example 11 | 5000 | 4.68 | 6000 | 410 | 190 | 0.463 |
| Example 12 | 24000 | 1.25 | 600 | 403 | 382 | 0.948 |
| Example 13 | 15000 | 1.67 | 650 | 401 | 263 | 0.656 |
| Comparative Example 4 | — | — | 0 | 416 | 74 | 0.178 |
| Comparative Example 5 | 5000 | 0 | 500 | 380 | 120 | 0.316 |
| Comparative Example 6 | 5000 | 0.5 | 100 | 380 | 128 | 0.337 |

Based on the comparison between the examples and the comparative examples in Table 2, the polymer composition (2) of the present invention used as a fiber crosslinking agent much more improves the water absorption properties of the treated fiber than a conventional polymer composition.

The invention claimed is:

1. A poly(meth)acrylic acid polymer composition comprising:
   a poly(meth)acrylic acid polymer; and
   a bisulfite (salt)-added (meth)acrylic acid (salt),
   wherein the poly(meth)acrylic acid polymer includes a main chain terminated with a sulfonic acid (salt) group and has a weight average molecular weight of 500 to 1000000,
   the amount of the bisulfite (salt)-added (meth)acrylic acid (salt) is 0.5 to 15 parts by mass relative to 100 parts by mass of the poly(meth)acrylic acid polymer in the polymer composition, and
   the poly(meth)acrylic acid polymer has 80 to 100 mol % of non-neutralized carboxyl groups based on 100 mol % of the total of non-neutralized carboxyl groups and neutralized carboxyl groups.

2. A fiber crosslinking agent containing the poly(meth)acrylic acid polymer composition according to claim 1.

3. A method for producing crosslinked fiber, comprising treating a fiber with the poly(meth)acrylic acid polymer composition according to claim 1,
   wherein the treating comprises steps of: (i) contacting the fiber with the poly(meth)acrylic acid polymer composition in the presence of a solvent; and (ii) drying the fiber.

4. The method for producing crosslinked fiber according to claim 3,
   wherein the crosslinked fiber has a water retention value of at least 150, the water retention value being measured at 5000 rpm for 10 minutes.

5. The method according to claim 3, wherein the fiber is at least one selected from group consisting of wood pulp fibers, cellulose fibers, cotton, cotton/polyester-blended fibers, wool, artificial fibers, glass fibers, carbon fibers, optical fibers, and metal fibers.

6. A crosslinked fiber obtained by treating a fiber with a poly(meth)acrylic acid polymer composition comprise a poly(meth)acrylic acid polymer and a bisulfite (salt)-added (meth)acrylic acid (salt), the poly(meth)acrylic acid polymer including a main chain terminated with a sulfonic acid (salt) group and has a weight average molecular weight of 500 to 1000000, the amount of the bisulfite (salt)-added (meth)acrylic acid (salt) being 0.5 to 15 parts by mass relative to 100 parts by mass of the poly(meth)acrylic acid polymer in the polymer composition, and the poly(meth)acrylic acid polymer having 80 to 100 mol % of non-neutralized carboxyl groups based on 100 mol % of the total of non-neutralized carboxyl groups and neutralized carboxyl groups,
   wherein the crosslinked fiber has a water retention value of at least 150, the water retention value being measured at 5000 rpm for 10 minutes.

7. A crosslinked fiber, obtained by treating a fiber with a poly(meth)acrylic acid polymer composition that comprises a poly(meth)acrylic acid polymer and a hypophosphorous acid (salt), the poly(meth)acrylic acid polymer including 0.6 to 10% by mass of hypophosphorous acid (salt) groups in a molecule and has a weight average molecular weight of 4,000 to 100,000, the amount of the hypophosphorous acid (salt) being 10 to 50000 ppm relative to the total amount of the poly(meth)acrylic acid polymer in the polymer composition, the poly(meth)acrylic acid polymer having 60 to 100 mol % of non-neutralized carboxyl groups based on 100 mol % of the total of non-neutralized carboxyl groups and neutralized carboxyl groups,
   wherein the crosslinked fiber has a water retention value of at least 150, the water retention value being measured at 5000 rpm for 10 minutes.

8. The crosslinked fiber according to claim 7, wherein the fiber is at least one selected from group consisting of wood pulp fibers, cellulose fibers, cotton, cotton/polyester-blended fibers, wool, artificial fibers, glass fibers, carbon fibers, optical fibers, and metal fibers.

9. The crosslinked fiber according to claim 7, wherein the treating comprises the steps of: (i) contacting the fiber with the poly (meth) acrylic acid polymer composition in the presence of a solvent; and (ii) drying the fiber.

* * * * *